Sept. 13, 1955 H. W. NORDYKE, JR 2,717,928

MULTI-CHANNEL TRANSDUCER

Filed Jan. 29, 1954 2 Sheets-Sheet 1

INVENTOR.
HORACE W. NORDYKE, JR.
BY John B Sponsler
AGENT

Sept. 13, 1955 H. W. NORDYKE, JR 2,717,928

MULTI-CHANNEL TRANSDUCER

Filed Jan. 29, 1954 2 Sheets-Sheet 2

INVENTOR.
HORACE W. NORDYKE, JR.
BY John B. Sponsler
AGENT

United States Patent Office 2,717,928

Patented Sept. 13, 1955

2,717,928

MULTI-CHANNEL TRANSDUCER

Horace William Nordyke, Jr., Poughkeepsie, N. Y., assignor to International Business Machines Corporation, New York, N. Y., a corporation of New York Application January 29, 1954, Serial No. 407,098

2 Claims. (Cl. 179—100.2)

This invention relates to magnetic transducer construction of a new type adapted to the varying needs of multiple channel read-write magnetic heads utilized in magnetic tape recorders and the like.

Normally multiple channel magnetic heads are expensive to manufacture and require extreme precision in the construction and machining of the mounting. Shielding between the transducer components requires further precision in design thereby increasing the cost of manufacture. Conventional designs include slotted construction wherein the transducer components are spaced apart in an accurately machined housing molded designs wherein the cost of construction is reduced at the sacrifice of accuracy of alignment, and staggered transducer construction wherein space factors are reduced with an overall increase in the size of the complete unit.

In the present invention a unique construction permits the use of a plurality of magnetic units to be grouped together in a manner which not only reduces construction costs, but also provides a simple means for obtaining the necessary accuracy of alignment of transducer components in multiple heads with a minimum of parts and utilizing mountings or housings for the multiple head structure having only moderate tolerance requirements. Furthermore, the same transducer units may be grouped together in multiple heads of various channel capacities without the necessity of head redesign.

Essentially the invention provides a magnetic transducer unit in the form of a wafer, each such wafer being a complete transducer, and these wafers may be grouped together simply by bolting them together to form the necessary channel capacity as desired. The spacing of the transducer units may be accomplished by employing shims of magnetic or non-magnetic material as required.

It is, therefor, an object of this invention to provide a magnetic transducer unit of water type construction which may be grouped with other wafers of the same type to provide a multiple channel transducer device of simple construction and low cost.

Another object of this invention is to provide a transducer unit having all of the necessary components self-contained so that in the manufacture of a multiple channel magnetic head it is only necessary to group several such units together to obtain the desired channel capacity.

Other objects of the invention will be pointed out in the following description and claims and illustrated in the accompanying drawings, which disclose, by way of examples, the principle of the invention and the best mode, which has been contemplated, of applying that principle.

Figure 1:
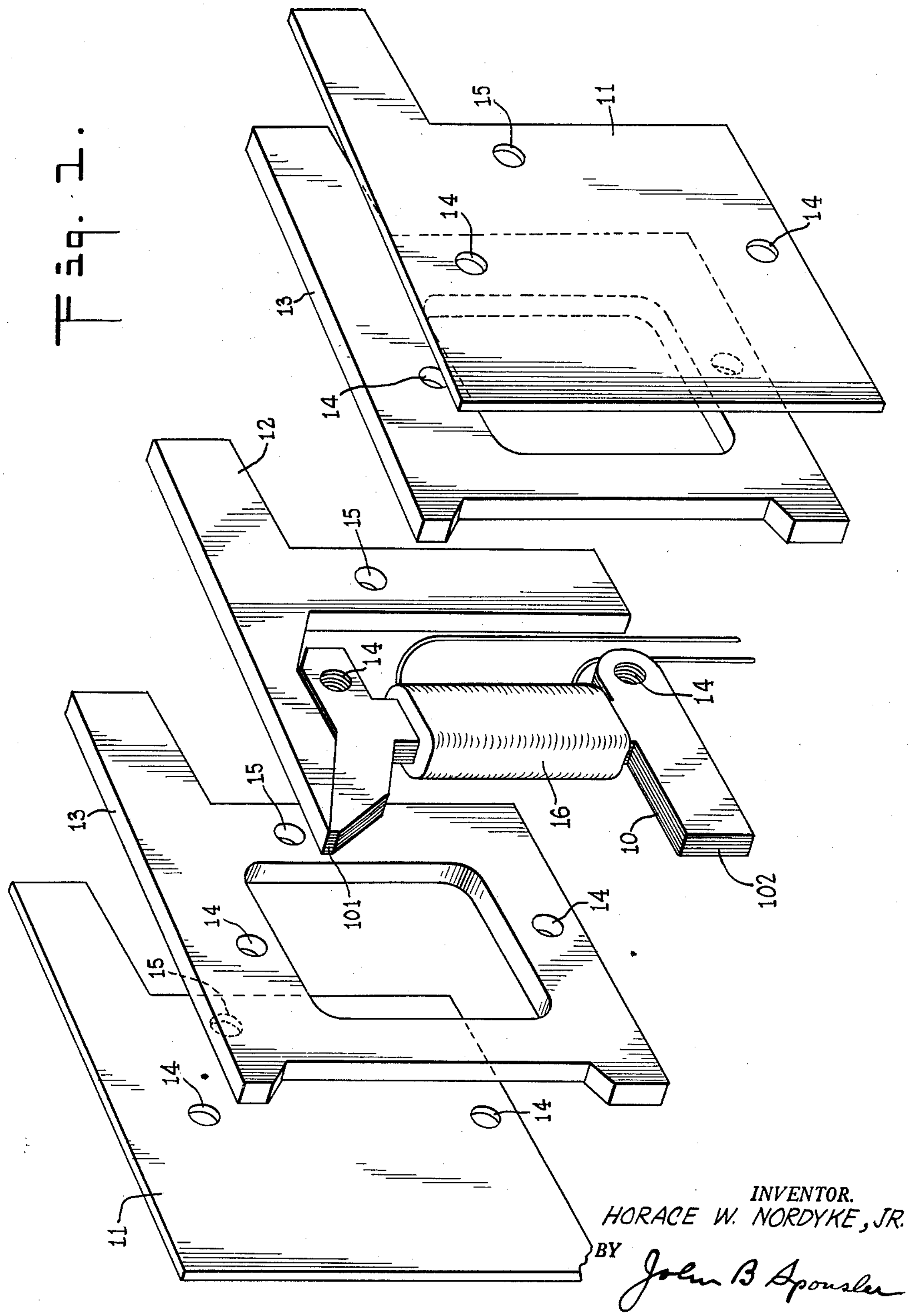
Fig. 1 is an exploded view in perspective of the transducer unit illustrating the wafer construction.

Now referring to Fig. 1 a series of stampings 10, 11, 12, and 13 are punched from sheet stock to provide the principal components of the transducer unit. The stampings 10 and 11 are punched from magnetic material such as soft iron or "mu" metal, which is well known in the art. The stampings 12 and 13 are punched from non-magnetic material such as brass, phosphor bronze, or copper. The contours of stampings 11 and 13 are identical. Each of the stampings 10, 11, and 13 is provided with mounting holes 14, and each of the stampings 11, 12, and 13 is provided with an additional locating hole 15.

Figures 2, 3, 4:
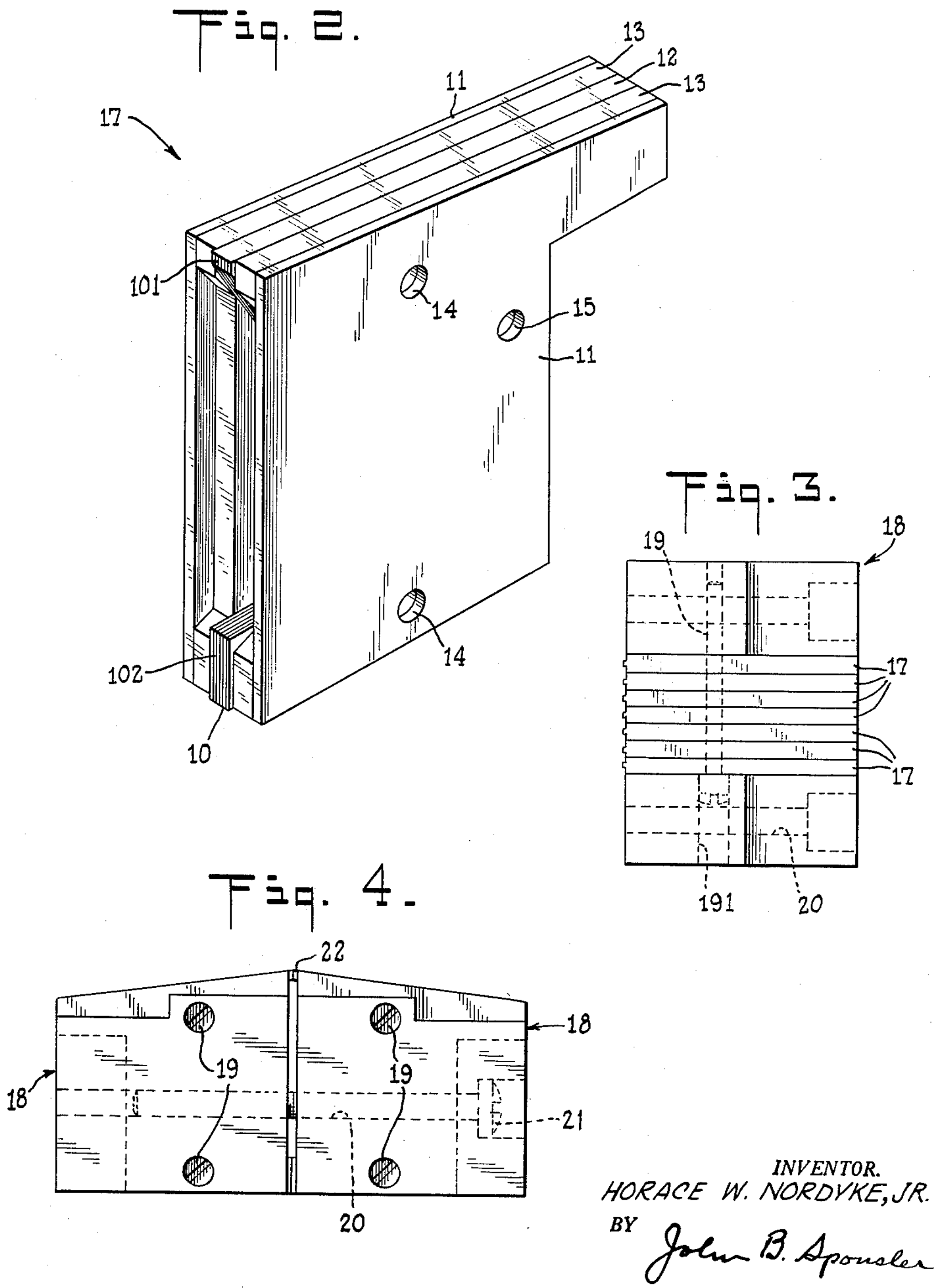
Fig. 2 is a view of the complete wafer.
Fig. 3 illustrates a top view of the assembly of a plurality transducer units of "wafer" construction to provide a multiple channel magnetic head section, two such sections being combined to form the complete magnetic head.
Fig. 4 illustrates an elevation view of the assembly of two sections as in Fig. 3 to provide a complete multiple channel magnetic head.

Fig. 2 illustrates the assembly of the transducer unit as a wafer 17, each such wafer including two stampings 11, two stampings 13, one stamping 12, and one stamping 10. The transducer winding 16 is wound over the stamping 10 (see Fig. 1), which may be of laminated construction to secure better magnetic properties. As previously explained the stampings 12 and 13 are of non-magnetic material having electrically conductive properties in order to provide shielding for each wafer against eddy current interference. The winding 16 is wound over the stamping 10 in a manner so that its turns do not build up to a greater thickness from the surface of the stamping 10 than the thickness of the stamping 13 which provides spacing for the winding between the stampings 11, which provide the principal shielding of each individual wafer 17.

Each wafer is assembled as shown in Figs. 1 and 2 by placing the individual stampings in the order shown by Fig. 1 upon a jig (not shown), the components being located thereon by the mounting holes 14 and the locating holes 15, the contours of the assembled stampings being congruent either totally or partially. Coincidental with the assembly upon the jig or fixture a cement is applied to the surfaces of the stampings and the completed wafers are clamped together until the cement dries. Thereafter the wafers are removed from the jig or fixture and the excess cement is removed from the wafer.

Fig. 3 illustrates one embodiment wherein the wafers 17 may be utilized to form a multiple magnetic head section. A U-shaped block 18 having a predetermined spacing between its shoulders is provided with bolts 19 which pass through the shoulders of the block 18 at holes 191 which correspond with the holes 14 of the stampings. The number of waters desired to comprise the multiple magnetic head is selected within the capacity of the block 18, and mounted therein being clamped by the bolts 19. Any remaining space not occupied by the wafers is filled by using stampings 11 and 13, as desired, to provide the necessary accuracy required. Where it is necessary that the accuracy be exceedingly great the stampings 11 and 13 may be punched from sheets of different thicknesses to give the required spacing.

The block 18 is also provided with two holes 20 running transversely of and spaced from the holes 191. After assembly of two sections similar to that of Fig. 3, the sections may be bolted together as in Fig. 4 by other bolts 21 to provide a complete multiple channel transducer wherein the air gap 22 of each wafer unit becomes the active portion of the transducer for coacting with a magnetic record. The gaps 22 are formed as a result of the design of the stamping 10, which acts as a magnetic core member, since the tips 101 thereof are automatically spaced apart when the butt ends 102 of stamping 10 are drawn together as the bolts 21 are tightened fully.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a magnetic recorder, a multi-channel transducer comprising two substantially identical sections oppositely disposed, each said section consisting of a like number of generally wafer-shaped transducer units, one said unit of each section corresponding to each recording channel, each said unit consisting of at least two externally disposed thin members of magnetic material, two intermediately disposed thin members of non-magnetic material, a central member consisting of a first generally T-shaped portion of non-magnetic material and a second generally U-shaped core portion of magnetic material, an electrical winding encompassing the base of said U-shaped core portion, said U-shaped core portion having a first blunt end projecting from said wafer-shaped transducer unit a short distance, said U-shaped core portion having a second tapered end projecting from said wafer-shaped transducer unit a lesser distance than said blunt end, each of said substantially identical sections being provided with means for aligning said generally wafer-shaped transducer units in a predetermined position whereby the corresponding core portions of each of said units uniformly project from said section, and means for clamping said substantially identical sections together so that said projecting core portions of each unit in one section are adjacent to the corresponding projecting core portions of each unit in the other section to form a plurality of magnetic circuits each having an air gap for co-acting with parallel channels of a magnetic record.

2. In a magnetic recorder, a multi-channel transducer comprising a first section and a second section substantially identical to said first section, each of said sections consisting of an equal number of generally wafer-shaped transducer units, a transducer unit of said first section and a transducer unit of said second section corresponding to each channel, each transducer unit consisting of two external layers of magnetic material, two intermediate layers of non-magnetic material, and a laminated central layer of magnetic material forming a generally U-shaped core portion having a first tapered end and a second blunt end, an electrical winding carried by said core portion intermediate said tapered end and said blunt end, means for holding in alignment said two external layers, said two intermediate layers and said central layer of each unit in such a manner that the blunt end of said core portion projects from said unit a distance greater than the distance that the tapered end of said core portion projects from said unit, each section including means for aligning the plurality of generally wafer-shaped transducer units so that the tapered ends of the core portions of said units are aligned and the blunt ends of said core portions are also aligned, and means for uniting said first section and said second section in such a manner that the blunt ends of the core portions of the transducer units carried by said first section respectively abut the blunt ends of the core portions of the transducer units carried by said second section and the tapered ends of said core portions of the transducer units carried by said first section being respectively slightly displaced from the tapered ends of the core portions of the transducer units carried by said second section whereby a plurality of magnetic circuits each having an air gap disposed within a common plane are formed.

References Cited in the file of this patent

| | | |
|---|---|---|
| 2,535,480 | Begun | Dec. 26, 1950 |
| 2,662,120 | Anderson | Dec. 8, 1953 |
| 2,689,274 | Saeger | Sept. 14, 1954 |